United States Patent
Fougeroux et al.

(10) Patent No.: US 7,260,727 B2
(45) Date of Patent: Aug. 21, 2007

(54) METHOD FOR SECURE STORAGE OF SENSITIVE DATA IN A MEMORY OF AN EMBEDDED MICROCHIP SYSTEM, PARTICULARLY A SMART CARD, AND EMBEDDED SYSTEM IMPLEMENTING THE METHOD

(75) Inventors: Nicolas Fougeroux, Le Chesnay (FR); Patrice Hameau, Boulogne Billancourt (FR); Benoît Bole, Versailles (FR)

(73) Assignee: CP8 Technologies, Paris (FR)

( * ) Notice: Subject to any disclaimer, the term of this patent is extended or adjusted under 35 U.S.C. 154(b) by 668 days.

(21) Appl. No.: 10/049,022

(22) PCT Filed: Jun. 8, 2001

(86) PCT No.: PCT/FR01/01773

§ 371 (c)(1),
(2), (4) Date: Feb. 8, 2002

(87) PCT Pub. No.: WO01/95273

PCT Pub. Date: Dec. 13, 2001

(65) Prior Publication Data

US 2002/0108051 A1 Aug. 8, 2002

(51) Int. Cl.
*G06F 12/14* (2006.01)
(52) U.S. Cl. .................... 713/189; 713/193; 713/194; 726/26
(58) Field of Classification Search ................ 713/189, 713/193, 194; 726/26
See application file for complete search history.

(56) References Cited

U.S. PATENT DOCUMENTS

| | | | |
|---|---|---|---|
| 4,968,873 A * | 11/1990 | Dethloff et al. .............. 235/380 |
| 5,150,407 A | 9/1992 | Chan | |
| 5,159,183 A | 10/1992 | Yamaguchi | |
| 5,199,070 A * | 3/1993 | Matsuzaki et al. ............. 380/30 |
| 5,375,169 A * | 12/1994 | Seheidt et al. ............... 713/171 |
| 5,436,972 A * | 7/1995 | Fischer ....................... 380/286 |
| 5,467,081 A | 11/1995 | Drews et al. | |
| 5,533,126 A * | 7/1996 | Hazard ........................ 713/187 |

(Continued)

FOREIGN PATENT DOCUMENTS

JP 2002-155819 6/2000

(Continued)

*Primary Examiner*—Nasser Moazzami
*Assistant Examiner*—David Garcia Cervetti
(74) *Attorney, Agent, or Firm*—Miles & Stockbridge P.C.; Edward J. Kondracki

(57) ABSTRACT

The invention concerns a method for secure storage of a piece of so-called sensitive data, for example an encryption key, in a memory (M) of an embedded microchip system, particularly a smart card (CP). The memory (M) comprises two physically distinct storage devices (1, 2), for example a permanent memory of the "ROM" type (1), and a second, re-programmable memory of the "EEPROM" type (2). The piece of sensitive data is divided into at least two parts (d, d'), in a given logical configuration, each of these parts being stored in one of the distinct storage devices (1, 2). An additional piece of verification data, a checksum or hash data, can also be stored in the first storage device (1), at the same time as the first sensitive data part (d).

The invention also concerns an embedded microchip system, particularly a smart card (CP).

11 Claims, 2 Drawing Sheets

U.S. PATENT DOCUMENTS

| | | | |
|---|---|---|---|
| 5,553,144 A | 9/1996 | Almquist et al. | |
| 5,557,346 A * | 9/1996 | Lipner et al. | 380/286 |
| 5,557,678 A * | 9/1996 | Ganesan | 380/282 |
| 5,623,546 A | 4/1997 | Hardy et al. | |
| 5,633,929 A * | 5/1997 | Kaliski, Jr. | 380/286 |
| 5,647,000 A * | 7/1997 | Leighton | 380/30 |
| 5,666,414 A * | 9/1997 | Micali | 380/286 |
| 5,675,649 A * | 10/1997 | Brennan et al. | 380/286 |
| 5,682,031 A | 10/1997 | Geronimi | |
| 5,737,419 A * | 4/1998 | Ganesan | 713/169 |
| 5,748,735 A * | 5/1998 | Ganesan | 713/165 |
| 5,757,909 A * | 5/1998 | Park | 380/201 |
| 5,787,173 A * | 7/1998 | Seheidt et al. | 380/277 |
| 5,799,086 A * | 8/1998 | Sudia | 705/76 |
| 5,828,753 A * | 10/1998 | Davis | 713/189 |
| 5,838,792 A * | 11/1998 | Ganesan | 380/282 |
| 5,841,865 A * | 11/1998 | Sudia | 380/286 |
| 5,850,451 A * | 12/1998 | Sudia | 380/286 |
| 5,857,022 A * | 1/1999 | Sudia | 713/173 |
| 5,872,849 A * | 2/1999 | Sudia | 713/175 |
| 5,901,227 A * | 5/1999 | Perlman | 713/157 |
| 5,907,618 A * | 5/1999 | Gennaro et al. | 380/286 |
| 5,910,989 A * | 6/1999 | Naccache | 713/173 |
| 5,912,453 A * | 6/1999 | Gungl et al. | 235/492 |
| 5,920,630 A * | 7/1999 | Wertheimer et al. | 380/286 |
| 5,953,422 A * | 9/1999 | Angelo et al. | 713/185 |
| 6,009,177 A * | 12/1999 | Sudia | 713/191 |
| 6,058,188 A * | 5/2000 | Chandersekaran et al. | 380/286 |
| 6,084,968 A * | 7/2000 | Kennedy et al. | 380/259 |
| 6,101,254 A * | 8/2000 | Thiriet | 380/2 |
| 6,118,874 A * | 9/2000 | Okamoto et al. | 380/282 |
| 6,175,924 B1 * | 1/2001 | Arnold | 713/189 |
| 6,182,217 B1 * | 1/2001 | Sedlak | 713/172 |
| 6,202,150 B1 * | 3/2001 | Young et al. | 713/167 |
| 6,209,098 B1 * | 3/2001 | Davis | 713/194 |
| 6,216,229 B1 * | 4/2001 | Fischer | 713/182 |
| 6,253,163 B1 * | 6/2001 | Lapie | 702/183 |
| 6,289,455 B1 * | 9/2001 | Kocher et al. | 713/194 |
| 6,295,606 B1 * | 9/2001 | Messerges et al. | 713/189 |
| 6,335,972 B1 * | 1/2002 | Chandersekaran et al. | 380/286 |
| 6,351,813 B1 * | 2/2002 | Mooney et al. | 713/185 |
| 6,393,565 B1 * | 5/2002 | Lockhart et al. | 713/172 |
| 6,396,929 B1 * | 5/2002 | Chandersekaran et al. | 380/286 |
| 6,411,716 B1 * | 6/2002 | Brickell | 380/286 |
| 6,483,920 B2 * | 11/2002 | Pinkas | 380/286 |
| 6,490,680 B1 * | 12/2002 | Scheidt et al. | 713/166 |
| 6,532,078 B2 * | 3/2003 | Hayama | 358/1.15 |
| 6,651,149 B1 * | 11/2003 | Iwasaki | 711/163 |
| 6,662,299 B1 * | 12/2003 | Price, III | 713/171 |
| 6,831,982 B1 * | 12/2004 | Hughes et al. | 380/281 |
| 6,853,988 B1 * | 2/2005 | Dickinson et al. | 705/75 |
| 6,934,854 B2 * | 8/2005 | Brucklmeier et al. | 713/1 |
| 2001/0010723 A1 * | 8/2001 | Pinkas | 380/286 |
| 2002/0013898 A1 * | 1/2002 | Sudia et al. | 713/155 |
| 2003/0061498 A1 * | 3/2003 | Drexler et al. | 713/189 |
| 2003/0079139 A1 * | 4/2003 | Drexler et al. | 713/193 |
| 2004/0054914 A1 * | 3/2004 | Sullivan | 713/189 |
| 2004/0208316 A1 * | 10/2004 | Wack et al. | 380/44 |
| 2005/0138374 A1 * | 6/2005 | Zheng et al. | 713/166 |

FOREIGN PATENT DOCUMENTS

| | | |
|---|---|---|
| WO | WO98 52160 | 11/1998 |
| WO | WO9960534 A1 * | 11/1999 |
| WO | WO0016272 A1 * | 3/2000 |

* cited by examiner

METHOD FOR SECURE STORAGE OF SENSITIVE DATA IN A MEMORY OF AN EMBEDDED MICROCHIP SYSTEM, PARTICULARLY A SMART CARD, AND EMBEDDED SYSTEM IMPLEMENTING THE METHOD

CROSS REFERENCE TO RELATED APPLICATION

The subject matter of the subject invention is related to application Ser. No. 10/049,025 filed on Feb. 8, 2002, in the names of Patrice HAMEAU, Nicolas FOUGEROUX, and Benoit BOLE, entitled "METHOD FOR SECURING THE PRE-INITIALIZATION PHASE OF AN EMBEDDED MICROCHIP SYSTEM, PARTICULARLY A SMART CARD, AND EMBEDDED SYSTEM IMPLEMENTING THE METHOD", the subject matter of which is incorporated herein in its entirety.

BACKGROUND OF THE INVENTION

1. Field of the Invention

It applies more particularly to a smart card.

The invention also relates to an embedded system for implementing the method.

In the context of the invention, the term "embedded system" refers to various systems or devices having in common the fact of using a microchip comprising data storage and data processing means, generally constituted by a microprocessor or a microcontroller. Such an embedded system can be constituted, in particular, by a smart card.

The term "sensitive" should be understood in its most general sense. It concerns all sorts of secret or at least confidential data, including encryption algorithms, secret encryption keys, identification data or information of a secret nature, etc., stored in one or more types of memories with which the smart cards are equipped. This type of data will hereinafter be referred to generically as "secret."

The invention applies more particularly, though not exclusively, to the storage of secret keys stored in order to be used for the secure pre-initialization of smart cards. In fact, it is well known that functions related to security are devolved to smart cards. Here again, the term security should be understood in a broad sense. This term actually covers various concepts: confidentiality, authentication, etc.

Hereinafter, in order to illustrate the concepts without in any limiting its scope, we will consider the preferred application of the invention, unless otherwise mentioned.

2. Description of the Related Art

Normally, in the prior art, the secrets contained in smart cards are stored linearly in the same storage area. In particular, the secrets are stored in permanent read-only memories ("ROM") or semi-permanent, i.e. electrically erasable programmable read-only memories, for example of the "EEPROM" type. The memories of microchips are vulnerable to hackers, and the attacks seen are becoming increasingly numerous and sophisticated.

In particular, the "dumping" (or copying) of the "ROM" memory is a constant concern for smart cards.

Memories of the "EEPROM" type, which traditionally contain so-called sensitive data, are subject to most of the attacks known at the present time.

SUMMARY OF THE INVENTION

The object of the invention is to eliminate the drawbacks of the devices of the prior art, some of which have just been mentioned.

The object of the invention is to provide a method for secure storage of sensitive data in the memory of a smart card, and more generally in the memory of an embedded microchip system.

It also concerns an embedded microchip system for implementing the method. The microchip comprises data storage and data processing means, generally under the control of an operating system (or "OS").

For this reason, according to an advantageous characteristic, the secret is physically and logically "split" into several storage means with which the microchip is equipped.

In one advantageous embodiment, the memory of said microchip is divided into distinct parts, the first being constituted by a "ROM" type memory, more generally a permanent ROM, the second part being constituted by a memory of the "EEPROM" type, more generally a semi-permanent EEPROM.

According to a first variant of the method of the invention, the same secret is "split" between two or more physically distinct memory parts.

In particular, in the preferred field of application of the invention, the method makes it possible to authenticate a smart card in the pre-initialization phase, when the "EEPROM" type memory part is still empty of any data other than that programmed by an entity that will be called a "chip manufacturer."

In the context of the invention, the term "pre-initialization" is meant in a general sense. It particularly relates to the manufacturing phase of a traditional smart card, or to the phase preceding the initialization phase of a so-called open smart card.

According to another advantageous embodiment, the majority of the data constituting the secret is stored in "ROM." Only a small part of this data is stored in "EEPROM."

According to this additional characteristic of the invention, the vast majority of a secret key is contained in the "ROM" type memory part. The chip manufacturer need only write a much smaller part of the secret key into the "EEPROM" type memory part in order for the aforementioned operating system to be able to use the secret key as a whole. Because of its particular storage, it should be noted that the secret key is sent in two parts to two distinct divisions of the manufacturer, which makes it possible to reduce the risks of fraud during the secret transfer.

This particular storage makes it possible to minimize the number of bytes probe-programmed by the manufacturer and consequently has the advantage of reducing manufacturing costs. In fact, to guarantee a high degree of security, the keys actually used are very long. It is possible to facilitate the storage of these very long keys, normally carried out in EEPROM, by remoting the largest parts into ROM.

According to a second variant of embodiment, a first secret is stored in a first part of the memory and one or more other secrets, directly or indirectly derived from the first secret, is (are) stored in at least one other part of a physically distinct memory. This or these additional secret(s) can advantageously be obtained by encryption.

For example, in a typical field of application of the method according to the invention, a (symmetric) encryption key is present in a first storage area of a smart card, of the "ROM" type, during its masking. A piece of confidential information is stored in a second storage area, of the "EEPROM" type, during the utilization of the smart card. This information is encrypted (for example using the so-called Triple DES algorithm) with the aforementioned encryption key present in the ROM area. This method is very advantageous. In fact, in addition to protection against the "dumping" of the memory, it is clear that the information is also protected when it is written into the smart card. Even the entity that "writes" the key does not know it.

From the above, it follows that, no matter which embodiments or variants of embodiments are considered, a successful fraudulent attack on one part of the memory cannot lead to the full knowledge of the secret. In reality, as long as the distribution of the elements of the secret among the distinct parts of the memory is done judiciously, partial knowledge of the secret acquired in a fraudulent manner will never make it possible to subsequently retrieve the secret, for example, by attempting a decryption using appropriate mathematical operations that would make it possible to deduce the full secret from the aforementioned partial knowledge. This judicious distribution itself is within the capability of one skilled in the art. The attack will then be considered to have finally failed.

Moreover, as will be shown below in greater detail, it is possible to associate the method of the invention with provisions for verification, authentication and/or encryption, which are intrinsically known, but for which the degree of security obtained is reinforced as a result of the provisions specific to the invention.

Hence, the main subject of the invention is a method for secure storage of a piece of so-called sensitive data in a memory of an embedded microchip system comprising at least two physically distinct storage means, characterized in that said piece of sensitive data is divided into at least two parts, in a given logical configuration, and in that each of said divided parts is stored in one of said physically distinct storage means.

Another subject of the invention is an embedded microchip system for implementing this method.

According to one particular embodiment, the method is characterized in that, said piece of sensitive data being divided into first (d) and second (d') parts, respectively stored in first (1) and second (2) physically distinct storage means, an operation called a checksum is performed on said sensitive data, concomitant with the storage of said second part (d), the result of which is in the form of a piece of informational data, in that said informational data is stored in said first storage means (1), and in that it includes a reading of said informational data, an additional checksum operation on said sensitive data, and a comparison between said informational data read and the result of said additional checksum operation with each use of said sensitive data, in order to certify its integrity.

According to one particular embodiment, the method is characterized in that, said piece of sensitive data being divided into first (d) and second (d') parts, respectively stored in first (1) and second (2) physically distinct storage means, an operation concomitant with the storage of said second part (d), called a checksum, is performed on said sensitive data, the result of which is in the form of a piece of informational data, in that said informational data is stored in said first storage means (1), and in that it includes a reading of said informational data, an additional checksum operation on said sensitive data, and a comparison between said informational data read and the result of said additional checksum operation with each use of said sensitive data, in order to certify its integrity.

BRIEF DESCRIPTION OF THE DRAWINGS

The invention will now be described in greater detail by referring to the attached drawings, in which.

As indicated in the preamble of the present specification, hereinafter we will consider the context of the preferred application of the invention, i.e., in the case of the securing of the pre-initialization phase of a smart card.

More precisely, we will illustrate the method according to the invention in its application to the storage of a symmetrical secret key that will hereinafter be referenced d. This key d can enable a smart card to generate a cryptogram from an appropriate asymmetric algorithm. This cryptogram, if it is returned to an authentication terminal of the smart card, can be used to authenticate the latter.

DESCRIPTION OF THE PREFERRED EMBODIMENTS

Figure 1:
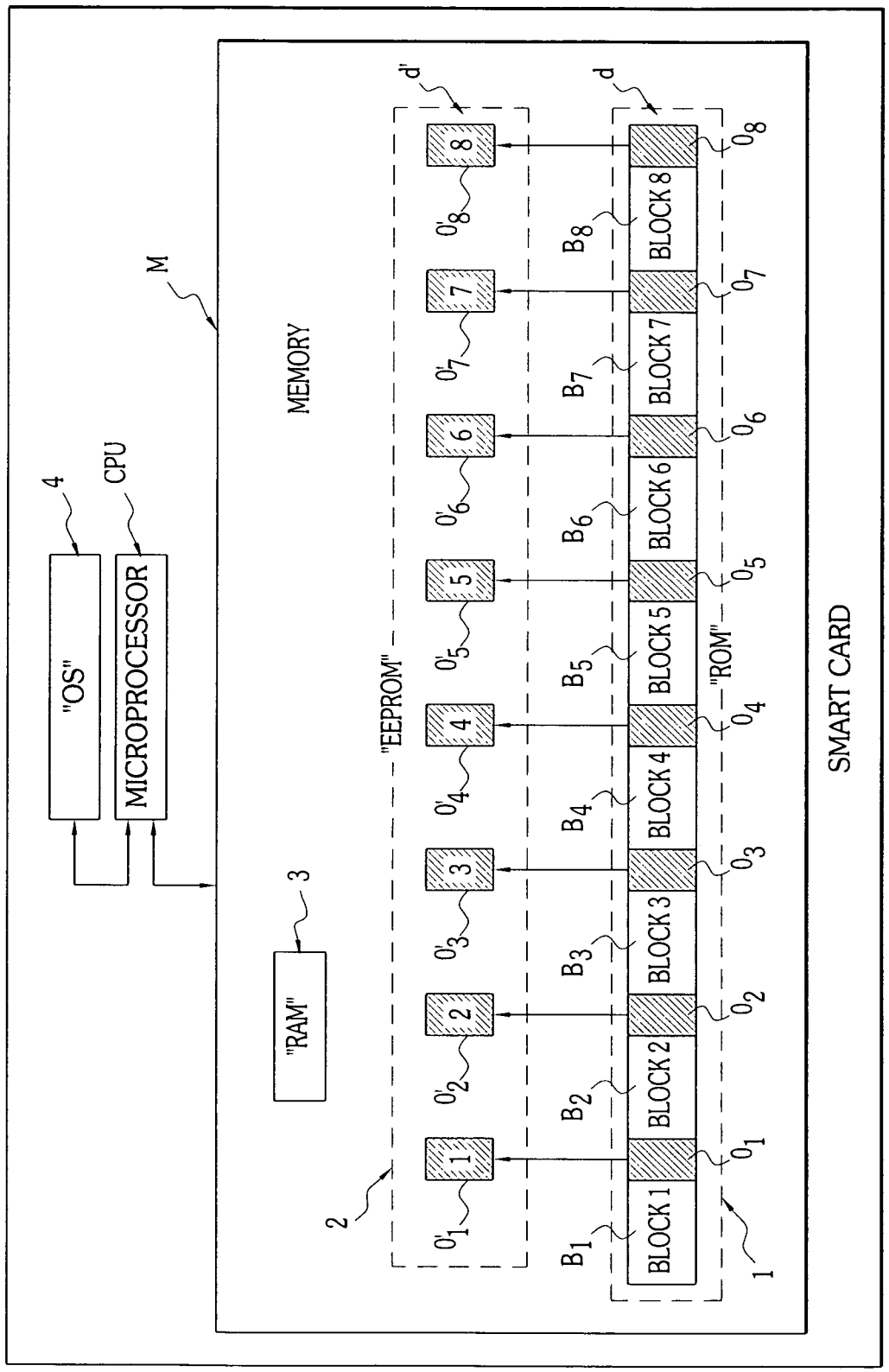
FIG. 1 schematically illustrates an exemplary configuration of the memory of a smart card according to one aspect of the invention, for an application of the method to the storage of a secret key.

FIG. 1 schematically illustrates an exemplary architecture of a smart card DP. The latter includes a memory M, itself constituted in the example described by a random access memory of the so-called "RAM" type 3 and by a nonvolatile memory comprising a permanent part 1 of the "ROM" type and a semi-permanent part 2 of the "EEPROM" or a similar type. The smart card CP also includes data processing means, for example a microprocessor referenced CPU, that cooperate with an operating system 4. The operating system is a piece of software constituted by a sequence of micro-instructions that can be completely or partially stored in a the ROM area 1 and/or the EEPROM area 1 of the memory M.

According to one of the characteristics of the invention, the storage of the key d takes place in at least two physically distinct parts of the memory M. More precisely, in the example illustrated, the storage of this key d takes place in a nonvolatile part of the memory M: a part in permanent memory 1, of the "ROM" type, and a part in semi-permanent memory 2, of the "EEPROM" or a similar type.

The secret key d is therefore composed of a part in ROM 1, present before its arrival at the entity called the "chip manufacturer," and a part written by the latter during a so-called "probe" operation into EEPROM 2. The bytes programmed into EEPROM 2 are extremely sensitive data, treated as security bytes. This of course requires that the secret key d be known at the time of the masking.

For example, to illustrate the concept, hereinafter we will consider a 1024-bit (or 128-byte secret key d.

In a preferred embodiment of the method of the invention, the key d resides entirely in ROM 1, but certain bytes are false or altered. For example, one byte per sixteen-byte block is a dummy, an erroneous value having purposely been written into the ROM code.

The various blocks of the key d are represented in FIG. 1 with the references $B_1$ through $B_8$. The erroneous bytes are referenced $O_1$ through $O_8$. The correct values of the bytes, referenced $O'_1$ through $O'_8$, are stored in EEPROM 2, also in the form of eight corresponding bytes. These bytes $O'_1$ through $O'_8$ form a partial key d'.

In this example, eight bytes (or 128/16=8) must therefore be programmed into EEPROM 2. But it should be understood that the storage in EEPROM 2 could be done in any fashion, since the operating system 4 cooperating with the data processing means CPU handles the reconstruction in RAM 3 of the full exact key, which can be called d", during its utilization. This reconstruction, in the example described, is done simply by substituting the correct bytes $O'_1$ through $O'_8$ for the erroneous bytes $O_1$ through $O_8$.

It is clear that the knowledge of one the keys, either d or d', by any means whatsoever, particularly by means of the aforementioned fraudulent "dumping" operations, would not make it possible to deduce the "full secret," i.e., the full correct key d".

As has been mentioned, in order to obtain good security, the keys are generally long, for example 128 bytes or 1024 bits as indicated above. The method according to the invention, in addition to the degree of security it provides, makes it possible to store in EEPROM 2 only a very small fraction of the full key d, i.e. 8 bytes or 64 bits. Only this key fraction should be "probe" written by the chip manufacturer, which is an important advantage, since this operation is long and costly.

It should be understood that many other configurations of the distribution of the key between two types of memory, ROM 1 and EEPROM 2, are possible. The two byte strings need only correspond one-to-one. However, the expert must make sure that this distribution does not allow the knowledge of one of the two partial keys, d (having the same length as the full correct key d", but partly "altered") or d', to make it possible, by means of mathematical or other methods, to deduce the full key from this partial knowledge. The distribution just described in reference to FIG. 1, for the key lengths considered, meets this requirement.

In an additional variant of the method of the invention, in order to further increase the degree of security obtained, the storage in ROM 1 of an additional piece of informational data is provided, making it possible to guarantee the integrity of the secret key d, and hence to maintain the integrity of the memories ROM 1 and EEPROM 2 over time. This piece of data can take the form of checksum calculated on the secret key. This piece of data can also be obtained by means of a hash function, or "hash" of this same key. To do this, in the latter case, an algorithm of the type known as "SHA-1" is advantageously used. This particular algorithm must therefore be installed in the smart card. The result of this hash function has a length of 160 bits. The initial operation for obtaining said key is concomitant with the storage of the key d in the ROM 1.

The checksum or the hash is executed with each utilization of the secret key and compared to the piece of informational data stored in the memory ROM 1.

Figure 2:
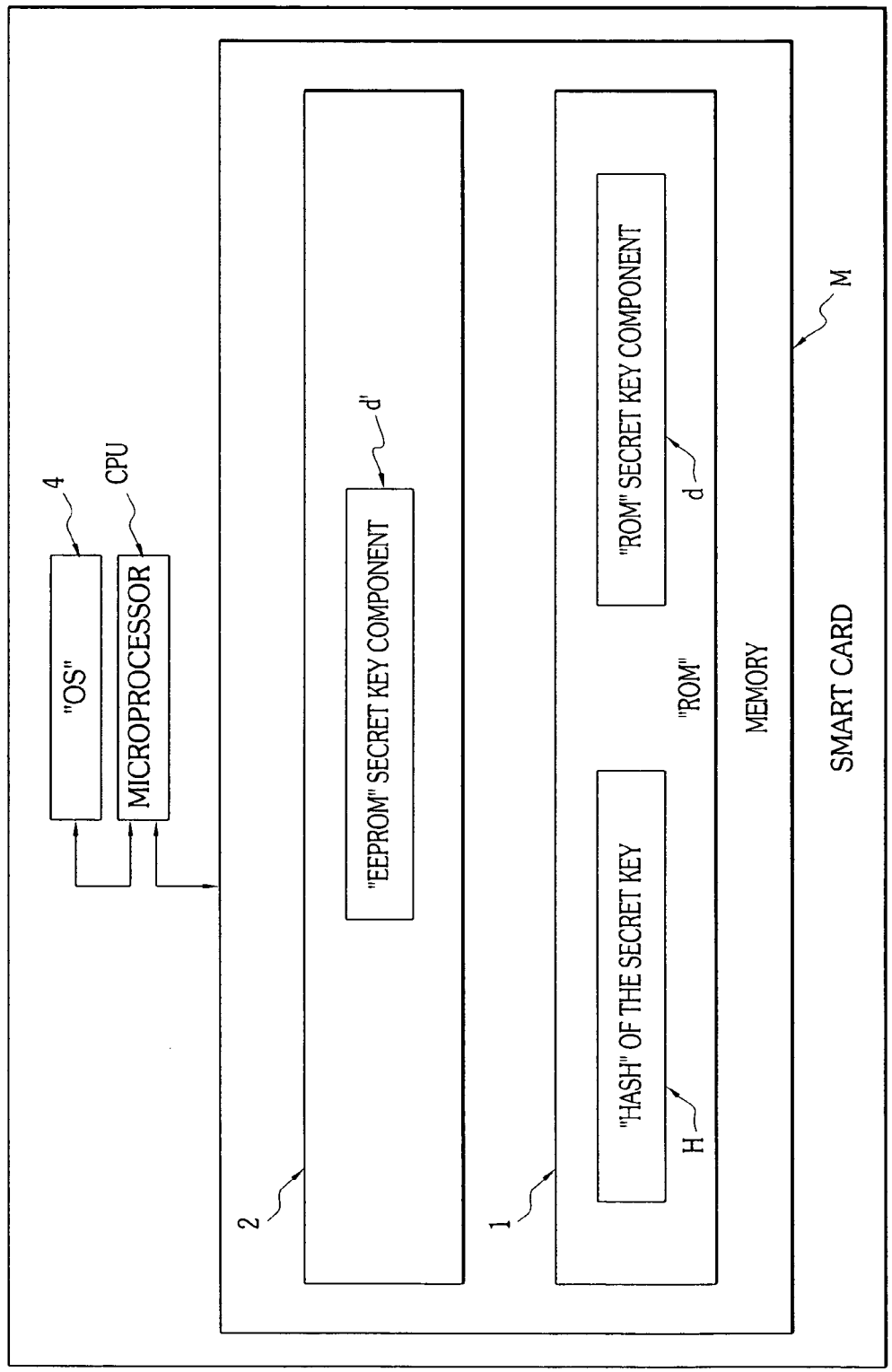
FIG. 2 schematically illustrates a variant of embodiment of the configuration of the memory of a smart card of FIG. 1.

FIG. 2 schematically illustrates the architecture of a smart card CP storing such "hash" data in ROM 1. The elements common to FIG. 1 have the same references and will only be re-described as necessary.

The piece of data H is stored in ROM 1 and verified with each utilization of the key in order to maintain the integrity of the storage areas ROM 1 and EEPROM 2. This verification is done under the control of the data processing means CPU and programs stored in the memory.

Up to this point in the description, it has been assumed, at least implicitly, that the secret data distributed between the two physically distinct parts of the memory M constitute one and the same secret.

In an additional variant of the method of the invention, the secret data stored in ROM 1 can constitute a first secret. Second secret data, derived from the first secret data, can constitute a second secret. This data, according to one of the characteristics of the invention, is then stored in a second physically distinct part of the memory M, for example in EEPROM 2. This data can advantageously be obtained by encrypting the first data using any appropriate algorithm, whether symmetric or not. The secret may be considered to be correctly "split" or "divided," in the sense of the method according to the invention, when it cannot be deduced from the knowledge of just one part of the memory M.

Through the reading of the above, it is easy to see that the invention achieves the stated objects.

It offers a high degree of security for the storage of sensitive data, such as keys or the like, by physically distributing them into at least two physically distinct parts of the memory of a smart card, and more generally of an embedded microchip system.

It must be clear, however, that the invention is not limited to just the exemplary embodiments explicitly described, particularly in relation to FIGS. 1 and 2.

In particular, it is possible to distribute the secret data into more than two physically distinct memory parts. Likewise, when the distributed data do not represent one and the same secret, the number of secrets derived from the first can be greater than one. It is also possible to derive cascading secrets and store them separately in physically distinct memory parts.

Nor is the invention limited to the authentication application in the preinitialization phase of a smart card that has been described in greater detail. It is applicable any time an encryption key or any other piece of sensitive data must be stored in the memory of an embedded system.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

We claim:

1. A method for secure storage of sensitive data in a memory of an embedded microchip system, said microchip including in said memory at least two physically distinct storage devices, said method comprising:

providing said sensitive data, which is constituted by a binary word with a length equal to a given number of bytes, processing said sensitive data, by dividing said binary word into at least two parts in a given logical configuration, and storing said divided at least two parts of said binary word into respective ones of said at least two physically distinct storage devices, so as to require a reconstruction of said binary word in said embedded microchip system.

2. A method according to claim 1, wherein said at least two parts are different parts of a single secret.

3. A method according to claim 1, wherein said at least two parts comprises a first part of said sensitive data that constitutes a first secret and a second part of said sensitive data derived from said first part so as to constitute an additional secret.

4. A method according to claim 1, wherein a first part of said sensitive data includes a first binary word constituted by blocks of bytes of a same length as said sensitive data, wherein said first part includes a string of correct bytes and altered bytes, distributed in said first binary word in a predetermined configuration, and wherein a second part of said sensitive data includes a second binary word with a length equal to a number of said altered bytes and constituted by bytes that correspond one-to-one with said altered bytes, so that said altered bytes can be corrected and said sensitive data can be reconstructed from said first part and said second part.

5. A method according to claim 4, wherein said sensitive data is an encryption key.

6. A method according to claim 1, wherein said sensitive data is divided into first and second parts which are respectively stored in said first and second physically distinct storage devices and wherein said method further comprises:
performing a checksum operation on said sensitive data, concomitant with storage of said second part into said second storage device, said checksum operation generating informational data;
storing said informational data in said first storage device;
reading said informational data;
performing an additional checksum operation on said sensitive data; and
performing a comparison between said informational data read in said reading step and a result of said additional checksum operation in order to certify integrity of said sensitive data.

7. A method according to claim 1, wherein said sensitive data is divided into first and second parts which are respectively stored in said first and second physically distinct storage devices, and wherein said method further comprises:
performing a hash operation on said sensitive data, concomitant with storage of said second part into said second storage device, said hash function generating informational data;
storing said informational data in said first storage device;
reading said informational data;
performing an additional hash operation on said sensitive data; and
performing a comparison between said informational data read in said reading step and a result of said additional hash operation in order to certify integrity of said sensitive data.

8. A method according to claim 7, wherein said hash operation includes applying an "SHA-1" algorithm to said sensitive data.

9. An embedded microchip system comprising:
in said microchip, storage means for storing sensitive data, said storage means comprising at least two physically distinct storage devices, wherein said sensitive data is a binary word divided into at least two parts with given configurations, each of said at least two physically distinct storage devices storing a respective one of said at least two parts of sensitive data, and means for reconstructing said sensitive data being provided in said embedded microchip system.

10. A system according to claim 9, wherein said storage means includes a first read-only storage device, and a second electrically erasable re-programmable read-only storage device, and wherein each of said first and second storage devices store a respective one of said two parts of said sensitive data.

11. A system according to claim 9, further comprising a smart card which includes said first storage device and said second storage device.

* * * * *

UNITED STATES PATENT AND TRADEMARK OFFICE
CERTIFICATE OF CORRECTION

PATENT NO. : 7,260,727 B2  Page 1 of 1
APPLICATION NO. : 10/049022
DATED : August 21, 2007
INVENTOR(S) : Fougeroux et al.

It is certified that error appears in the above-identified patent and that said Letters Patent is hereby corrected as shown below:

Title Page

Please insert the following priority information:

Item (30)   Foreign Application Priority Data

June 8, 2000   (FR)   0007318

Signed and Sealed this

Thirteenth Day of November, 2007

JON W. DUDAS
*Director of the United States Patent and Trademark Office*